(12) United States Patent
Kluttz et al.

(10) Patent No.: US 7,622,519 B2
(45) Date of Patent: Nov. 24, 2009

(54) BITUMINOUS BINDER COMPOSITION AND PROCESS FOR PREPARING THE SAME

(75) Inventors: Robert Q. Kluttz, Houston, TX (US); Keith E. Stephens, Houston, TX (US)

(73) Assignee: Kraton Polymers U.S. LLC, Houston, TX (US)

( * ) Notice: Subject to any disclaimer, the term of this patent is extended or adjusted under 35 U.S.C. 154(b) by 41 days.

(21) Appl. No.: 12/111,249

(22) Filed: Apr. 29, 2008

(65) Prior Publication Data

US 2008/0275183 A1  Nov. 6, 2008

Related U.S. Application Data

(60) Provisional application No. 60/927,049, filed on May 1, 2007.

(51) Int. Cl.
*C08L 95/00* (2006.01)
(52) U.S. Cl. .......................................... 524/68
(58) Field of Classification Search .................... 524/68
See application file for complete search history.

(56) References Cited

U.S. PATENT DOCUMENTS

| | | |
|---|---|---|
| 3,231,635 A | 1/1966 | Holden et al. |
| 3,244,664 A | 4/1966 | Zelinski et al. |
| 3,251,905 A | 5/1966 | Zelinski |
| 3,281,383 A | 10/1966 | Zeliniski et al. |
| 3,390,207 A | 6/1968 | Moss et al. |
| 3,594,452 A | 7/1971 | De La Mare et al. |
| 3,598,887 A | 8/1971 | Darcy et al. |
| 3,692,874 A | 9/1972 | Farrar et al. |
| 3,880,954 A | 4/1975 | Kahle et al. |
| 3,985,830 A | 10/1976 | Fetters et al. |
| 4,076,915 A | 2/1978 | Trepka |
| 4,104,332 A | 8/1978 | Zelinski |
| 4,145,322 A | 3/1979 | Maldonado et al. |
| 4,185,042 A | 1/1980 | Verkouw |
| 4,219,627 A | 8/1980 | Halasa et al. |
| 4,242,246 A | 12/1980 | Maldonado et al. |
| 4,370,448 A | 1/1983 | Leland |
| 4,379,891 A | 4/1983 | Haynes |
| 5,075,377 A | 12/1991 | Kawabuchi et al. |
| 5,159,022 A | 10/1992 | Ikematu et al. |
| 5,182,319 A | 1/1993 | Mitchell |
| 5,190,998 A | 3/1993 | Fisher |
| 5,272,214 A | 12/1993 | Custro et al. |
| 5,681,895 A | 10/1997 | Bening et al. |
| 5,795,929 A | 8/1998 | Grubba |
| 6,087,420 A | 7/2000 | Planche et al. |
| 6,150,439 A | 11/2000 | Keiichi et al. |
| 6,362,282 B1 | 3/2002 | DeDecker |
| 6,486,236 B2 | 11/2002 | Wollum et al. |
| 6,833,411 B2 | 12/2004 | Fujiwara et al. |
| 7,125,940 B2 | 10/2006 | Willis |
| 2004/0077789 A1 | 4/2004 | Toda et al. |
| 2004/0167292 A1* | 8/2004 | Willis .................. 525/331.9 |
| 2005/0004273 A1 | 1/2005 | Chun et al. |
| 2005/0171276 A1* | 8/2005 | Matsuda et al. ............. 524/572 |
| 2005/0228119 A1 | 10/2005 | Vermunicht et al. |
| 2006/0074152 A1 | 4/2006 | Graves et al. |
| 2006/0183844 A1 | 8/2006 | Vermunicht et al. |
| 2006/0229390 A1 | 10/2006 | Chun et al. |
| 2007/0112102 A1 | 5/2007 | Kluttz et al. |
| 2008/0194716 A1* | 8/2008 | Sasagawa et al. ........... 521/139 |

FOREIGN PATENT DOCUMENTS

| | | |
|---|---|---|
| CN | 1141928 | 2/1997 |
| EP | 0 387 671 A1 | 9/1990 |
| EP | 636 654 A1 | 2/1995 |
| EP | 1431348 A1 | 6/2004 |
| EP | 0 413 294 A1 | 3/2008 |
| JP | 03143961 | 6/1991 |
| JP | 05279574 | 10/1993 |
| JP | 10279809 | 10/1998 |
| WO | 94/22931 A1 | 10/1994 |

* cited by examiner

*Primary Examiner*—Peter Szekely
(74) *Attorney, Agent, or Firm*—Donna B. Holguin; Novak, Druce & Quigg LLP

(57) ABSTRACT

The present invention is directed to a process for preparing a polymer modified bituminous binder composition in the substantial absence of crosslinking agents by heating a bitumen component in a stirred tank to a temperature from 160° C. to 221° C.; adding a block copolymer composition to the bitumen component while the bitumen component is being stirred to form a homogeneous mixture of the bitumen component and the block copolymer composition; and continuing to stir the homogeneous mixture while maintaining the temperature from 180° C. to 221° C. for a total period of time from 4 hours to 30 hours thereby forming a cured polymer modified bituminous binder composition. The block copolymer composition utilized in the process comprises one or more block copolymers having at least one monovinylaromatic block and either (I) at least one polybutadiene block having a vinyl content of less than 15 mol percent and at least one polybutadiene block having a vinyl content of greater than 25 mol percent or (II) at least one polybutadiene block having a vinyl content that tapers from a vinyl content of less than 15 mol percent at the first end adjacent to the monovinylaromatic block to a vinyl content that is greater than 25 mol percent at the second end which is furthest from the monovinylaromatic block and optionally at least one polybutadiene block having a vinyl content of less than 15 mol percent.

The present invention is further related to an alternative to this process, a specific class of bituminous binder compositions and concentrates and a specific class of block copolymer compositions.

41 Claims, No Drawings

BITUMINOUS BINDER COMPOSITION AND PROCESS FOR PREPARING THE SAME

CROSS REFERENCE TO RELATED APPLICATIONS

The present application claims priority to U.S. Provisional Patent Application Ser. No. 60/927,049 filed May 1, 2007, the contents of which are incorporated herein by reference.

FIELD OF THE INVENTION

The present invention relates to a process for preparing a polymer modified bituminous binder composition that has improved ductility, particularly at low temperatures, and is suitable for hot mix asphalt paving applications in the substantial absence of crosslinking agents. The present invention further relates to a polymer modified bituminous binder composition having improved ductility, particularly at low temperatures, comprising a bitumen component and a block copolymer composition that contains one or more block copolymers having at least one monovinylaromatic block and either (I) at least one polybutadiene block having a vinyl content of less than 15 mol percent and at least one polybutadiene block having a vinyl content of greater than 25 mol percent or (II) at least one polybutadiene block having a vinyl content that tapers from a vinyl content of less than 15 mol percent at the first end adjacent to the monovinylaromatic block to a vinyl content that is greater than 25 mol percent at the second end which is furthest from the monovinylaromatic block. The present invention further relates to a concentrate of the polymer modified bituminous binder composition and the block copolymer compositions utilized.

BACKGROUND OF THE INVENTION

Polymer modified asphalt for paving applications and methods for preparing various polymer modified asphalt compositions are well known in the art. Various polymers, including diene elastomers such as polybutadiene, EPDM, EPR and styrenic block copolymers (SBCs) such as styrene-butadiene-styrene (SBS) and styrene-isoprene-styrene (SIS) block copolymers, are commonly combined with bitumen to improve the performance of the bitumen. See, for example, U.S. Pat. No. 5,190,998 and U.S. Pat. No. 6,150,439.

It is well known in the art to utilize styrenic block copolymers to improve the performance of bitumen. The degree to which property improvements are realized depends upon the compatibility of the block copolymer and the bitumen. Over the years, researchers have developed a range of chemical techniques to improve the compatibility of polymers with bitumens. An extensive range of additives (sulfur crosslinking agents and sulfur-containing crosslinking agents) have been used for the purpose of "curing" or "crosslinking" the polymers and bitumens thereby rendering the mixture compatible. Sulfur has long been known to be added to polymer modified bitumens to strengthen and accelerate the polymer-bitumen bonding and curing process. See, for example, U.S. Pat. No. 4,145,322 and U.S. Pat. No. 4,242,246. While sulfur itself is relatively safe, the reaction between sulfur, the block copolymers and asphalt generates hydrogen sulfide ($H_2S$) which is extremely hazardous. As a result, the elimination of sulfur and sulfur containing crosslinking agents which aid in the curing of bituminous formulations would be considered a positive aspect.

U.S. patent application Ser. No. 11/598,511, published as US 2007/0112102 A1, discloses a process for preparing a polymer modified bituminous binder composition in the substantial absence of crosslinking agents, using a block copolymer composition that contains a high vinyl content diblock copolymer and optionally a high vinyl content block copolymer selected from linear triblock copolymers, multiarm coupled block copolymers and mixtures thereof. Using such a process and composition results in a product that is storage stable, readily mixable and has a quick cure while at the same time minimizing the environmental impact caused by the addition of sulfur or sulfur-containing crosslinking agents.

In areas having moderately cold to severe winters, high ductility at low temperatures is also an extremely desirable property. Bituminous material that does not have sufficient ductility tends to produce spurious pavement surfaces and cracking in moderately cold or severe weather thereby leading to asphalt failure and poor to dangerous surface conditions.

Accordingly, there exists a need for an improved polymer-modified bituminous binder composition and process for preparing the same which demonstrates not only high ductility but also the properties achieved when utilizing the bituminous binder composition of US Publication 2007/0112102 A1. Ideally, such a process and product would provide ready mixing, be stable in storage, have a quick cure of polymer and bitumen and have improved ductility, particularly at low temperatures.

SUMMARY OF THE INVENTION

The present invention provides a way to produce polymer modified bituminous binder compositions for road/paving applications that has high ductility without the necessity of adding crosslinking agents. By utilizing the block copolymer composition of the present invention in the process of the present invention, it is possible to minimize environmental and safety concerns associated with the use of sulfur containing crosslinking agents while at the same time providing a product which demonstrates improved ductility, especially in low temperature environments.

More specifically, the present invention provides a process for preparing a polymer modified bituminous binder composition in the substantial absence of crosslinking agents that has improved ductility by:
  (a) heating a bitumen component in a stirred tank to a temperature from 160° C. to 221° C.;
  (b) adding a block copolymer composition to the bitumen component while the bitumen component is being stirred to form a homogeneous mixture of the bitumen component and the block copolymer composition; and
  (c) continuing to stir the homogeneous mixture at a temperature from 180° C. to 221° C. for a total period of time from 2 hours to 30 hours thereby forming a cured polymer modified bituminous binder composition;

with the proviso that when the temperature in step (c) is greater than 199° C., the homogeneous mixture will continue to be stirred in step (c) for a total period of time from 2 to 15 hours; and wherein said block copolymer composition comprises one or more block copolymers having at least one monovinylaromatic block and either (I) at least one polybutadiene block having a vinyl content of less than 15 mol percent and at least one polybutadiene block having a vinyl content greater than 25 mol percent or (II) at least one polybutadiene block having a vinyl content that tapers from a vinyl content of less than 15 mol percent at the first end adjacent to the monovinylaromatic block to a vinyl content that is greater than 25 mol percent at the second end which is furthest from the monovinylaromatic block. Optionally, this process may further comprise the step of diluting the homogeneous mixture to a lesser concentration either during or after the curing of the polymer modified bituminous binder composition.

In one embodiment of the present invention, the block copolymer composition of the present invention comprises:

(i) a block copolymer of the formula S-B1-B2 wherein S is a monovinylaromatic hydrocarbon block having a peak molecular weight from about 10,000 to about 25,000, B1 is a polybutadiene block having a vinyl content of less than 15 mol percent, B2 is a polybutadiene block having a vinyl content of greater than 25 mol percent, and the ratio of B1 to B2 is greater than or equal to 1:1, and wherein the S-B1-B2 block copolymer has a peak molecular weight from about 40,000 to about 200,000; and (ii) optionally one or more block copolymers of the formula $(S-B1-B2)_nX$ wherein each S is a monovinylaromatic hydrocarbon block having a peak molecular weight from about 10,000 to about 25,000, each B1 is a polybutadiene block having a vinyl content of less than 15 mol percent, each B2 is a polybutadiene block having a vinyl content of greater than 25 mol percent, n is an integer from 2 to 6, and X is the residue of a coupling agent, the ratio of B1 to B2 is greater than or equal to 1:1, and wherein the $(S-B1-B2)_nX$ block copolymer has a peak molecular weight that is from 1.5 to 6.0 times the peak molecular weight of the S-B1-B2 block copolymer; and wherein when both S-B1-B2 and $(S-B1-B2)_nX$ are present in the block copolymer composition, the ratio of S-B1-B2 to $(S-B1-B2)_nX$ is greater than 1:1.

In a still further modification of this embodiment, the block copolymers would contain an optional polybutadiene block adjacent to the B2 block such that the formulas represented in sections (i) and (ii) above would respectively be S-B1-B2-B3 and (S-B1-B2-B3)nX wherein each B1 and B2 is as defined hereinbefore and each B3 is a polybutadiene block having a vinyl content of less than 15 mol percent. In this embodiment, the peak molecular weight of the B3 block would range from about 1,000 to about 25,000 and the overall peak molecular weights of the block copolymers would be within the same range as defined hereinbefore.

In an alternative embodiment of the present invention, the block copolymer composition of the present invention comprises:

(i) a block copolymer of the formula S-B4 wherein S is a monovinylaromatic hydrocarbon block having a peak molecular weight from about 10,000 to about 25,000, B4 is a polybutadiene block having a vinyl content that tapers from less than 15 mol percent at the first end adjacent to the monovinylaromatic block (S) to a vinyl content that is greater than 25 mol percent at the second end which is furthest from the monovinylaromatic block (S) and wherein the S-B4 block copolymer has a peak molecular weight from about 40,000 to about 200,000; and (ii) optionally one or more block copolymers of the formula $(S-B4)_nX$ wherein each S is a monovinylaromatic hydrocarbon block having a peak molecular weight from about 10,000 to about 25,000 and each B4 is a polybutadiene block having a vinyl content that tapers from less than 15 mol percent at the first end adjacent to the monovinylaromatic block (S) to a vinyl content that is greater than 25 mol percent at the second end which is furthest from the monovinylaromatic block (S), n is an integer from 2 to 6, and X is the residue of a coupling agent and wherein the $(S-B4)_nX$ block copolymer has a peak molecular weight that is from 1.5 to 6.0 times the peak molecular weight of the S-B4 block copolymer; and wherein when both S-B4 and $(S-B4)_nX$ are present in the block copolymer composition, the ratio of S-B4 to $(S-B4)_nX$ is greater than 1:1.

In a still further modification of this embodiment, the block copolymers would contain an optional polybutadiene block such that the formulas represented in sections (i) and (ii) above would respectively be S-B4-B5 and (S-B4-B5)nX wherein each B4 is as defined hereinbefore and each B5 is a polybutadiene block having a vinyl content of less than 15 mol percent. In this embodiment, the peak molecular weight of the B5 block would range from about 1,000 to about 25,000 and the overall peak molecular weights of the block copolymers would be within the same range as defined hereinbefore.

When using either the above embodiments, the block copolymer composition of the present invention may still further comprise one or more additional block copolymers.

The present invention also provides an alternative process which comprises the steps of:

(a) heating a bitumen component in a stirred tank until it reaches a molten state;

(b) adding a block copolymer composition to the bitumen component;

(c) raising the temperature of the bitumen component and block copolymer composition to from about 160° C. to about 221° C. while stirring the bitumen component and block copolymer composition thereby forming a homogeneous mixture of the bitumen component and the block copolymer composition;

(d) continuing to stir the homogeneous mixture at a temperature from about 180° C. to about 221° C. for a total period of time from about 2 hours to about 30 hours until a cured polymer modified bituminous binder composition is obtained;

with the proviso that when the temperature in step (d) is greater than 199° C., the homogeneous mixture will continue to be stirred for a total period of time from 2 to 15 hours; and wherein said block copolymer composition is one of the embodiments as defined hereinbefore. Optionally, this additional process may further comprise the step of diluting the homogeneous mixture to a lesser concentration either during or after the curing of the polymer modified bituminous binder composition.

The present invention even further relates to a specific class of bituminous binder compositions and bituminous binder concentrates which comprise a bitumen component and one of the block copolymer compositions as defined hereinbefore as well as the specific block copolymer compositions utilized.

DETAILED DESCRIPTION

The process of the present invention is particularly useful for preparing polymer modified bituminous binder compositions to be used for road/paving applications in areas that experience cold to severe winters since the bituminous binder compositions of the present invention have improved ductility and do not need the addition of sulfur containing crosslinking agents. By using the process of the present invention, which does not require the use of crosslinking agents, it is possible to prepare polymer modified bituminous binder compositions that not only demonstrate ductility properties that are as good, if not better, than the prior art polymer modified bituminous binder compositions, especially with regard to ductility at low temperatures, but which are also safer and more environmentally friendly due to the elimination of the crosslinking agents. In addition to improved ductility, the polymer modified bituminous binder compositions of the present invention also exhibit excellent processability and cure time, as well as a reduction in phase separation.

In one embodiment of the present process, a bitumen component is heated in a stirred tank to a temperature from about 160° C. to about 221° C. The bitumen component utilized in the process according to the present invention may be any naturally occurring bitumen or it may be derived from petroleum. In addition, petroleum pitches obtained by a cracking process and coal tar can be used as the bitumen component as well as blends of various bitumen materials. Examples of suitable components include, but are not limited to, distillation or "straight-run bitumens", precipitation bitumens (e.g. propane bitumens), blown bitumens (e.g. catalytically blown bitumen), multigrades, and mixtures thereof. Other suitable bitumen components include, but are not limited to, mixtures of one or more of these bitumens with extenders (fluxes) such as petroleum extracts, e.g. aromatic extracts, distillates or residues, or with oils. Suitable bitumen components (either "straight-run bitumens" or "fluxed bitumens") are those having a penetration of in the range of from about 25 to about 400 units at 25° C.; therefore quite hard bitumens of a penetration of from about 60 to about 70 units may be used, but generally a straight run or distilled bitumen having a penetration from about 110 to about 250 units will be the most convenient to use. Both compatible as well as incompatible bitumens may be used.

The success of the process of the present invention is not dependent upon the type of tank (or vessel) utilized to prepare the polymer modified bituminous binder composition of the present invention. Accordingly, any known tank or vessel utilized in the preparation of bitumen compositions can be used provided that such tank or vessel has stirring (agitation) and heating capabilities. As used within the scope of the present invention, the phrase "stirred tank" refers to such tanks and vessels that have stirring (agitation) and heating means. Suitable stirring or agitation includes, but is not limited to, vertical impellers, side-arm impellers and pump around circulation. In terms of carrying out the process, the bitumen component is typically placed in the stirred tank and gradually heated to a temperature in the range of from about 160° C. to about 221° C., alternatively from about 170° C. to about 210° C., and in still another alternative, from about 180° C. to about 200° C. The bitumen component is typically stirred or agitated during this heating phase. While the presence of air is not detrimental to the process of the present invention (i.e., the use of an open air vessel which results in the surface of the mixture coming in contact with air), the intentional introduction of air (as in the case of air curing or blown bitumen) is not necessary to the process of the present invention and is in fact discouraged since such addition would most likely result in the hardening of the bitumen component.

In the present embodiment, once the bitumen component has reached the desired temperature, the block copolymer composition (described below) is added while the bitumen component is being stirred in order to form a homogeneous mixture of the bitumen component and the block copolymer composition.

The manner and form in which the block copolymer composition is added to the bitumen component is also not critical to the invention. Therefore, block copolymer compositions in the form of powders, porous pellets, and/or crumb may be added all at once or divided into small amounts or batches and added at intervals over a brief period of time (e.g., over a period of 5 to 60 minutes although slightly shorter or longer times are also envisioned). In most instances, the block copolymer composition is added in the form of a porous pellet all at once. Addition of the block copolymer composition over an even longer period of time is also possible but not necessarily desirable from an economic standpoint. During the addition of the block copolymer composition, the mixture is stirred and the temperature to which the bitumen component was heated (from about 160° C. to about 221° C.) is maintained.

In many bitumens, the block copolymer composition may dissolve and form a homogeneous blend with simple stirring or other agitation means as noted above. In hot mix asphalts, the bitumen forms a thin film on the aggregate that is present. It is generally accepted that the thickness of this film is on the order of approximately ten microns. Bitumen additives are generally considered to be homogeneous within a blend if they completely disperse in the bitumen on an equal or finer scale than the film of bitumen on aggregate. On the other hand, it is well known that SBS polymers dispersed in bitumen to form a phase structure comprising a polymer rich phase and a bitumen rich phase. It is generally accepted that the scale of this phase structure is on the order of less than approximately ten microns. Accordingly, as used herein with regard to the present invention, the phrase "homogeneous blend" refers to a mixture that comprises the bitumen component and block copolymer composition such that the block copolymer composition is dispersed within the bitumen component on the approximate ten micron scale or less.

In certain instances it may be desirable to accelerate this blending process by passing the mixture through a high shear mill. While a high shear mill may be utilized for the entire process, it is typically utilized for a sufficient period of time for the block copolymer to form a homogeneous blend with the bitumen component. The time to form a homogeneous blend utilizing high shear mixing/stirring will typically range from about 0 hours to about 8.0 hours, more typically from about 0.5 to about 4 hours and even more preferably from about 0.5 hours to about 2.0 hours. Thereafter the stirring is typically accomplished utilizing low shear blending. Preferably, the initial stirring is accomplished at high shear with the stirring thereafter (step (c)) being carried out at low shear. Both of these processes are well known in the art and are contemplated to be within the scope of the present invention. Once the block copolymer composition and bitumen are mixed (a homogeneous blend is formed), the stirring is continued for a period of time from about 2 to about 30 hours at a temperature that is from about 180° C. to about 221° C. in order to allow for complete curing of the mixture prior to use. Preferably, the temperature will be from about 180° C. to about 210° C., more preferably from about 185° C. to about 199° C., and even more preferably from about 185° C. to about 195° C. In alternative embodiments of the present process, the stirring in this step occurs for periods of time from 4 to 26 hours, preferably from 5 to 24 hours and more preferably from 5 to 15 hours and most preferably from 6 to 10 hours. Note that when the block copolymer composition is stirred at a temperature that is greater than 199° C., the duration of the stirring should be decreased since there could be degradation of the polymer at temperatures higher than 199° C. when heated at this temperature for greater than 15 hours. Accordingly, when the temperature is greater than 199° C., the stirring in step (c) will last for a total period from 2 to 15 hours.

The quantity of block copolymer composition to be added in the process of the present invention can vary based on whether it is desirable to have a concentrate which will be subsequently diluted ("let down") before further use or whether the amount added provides the final dilution to be used at that time (the final product). Accordingly, the amount to be added will be such that the amount of block copolymer composition added to the bitumen component will be from as little as about 2% by weight to as high as about 36% by weight, based on the weight of the polymer modified bituminous binder composition. As used within the scope of this application, the term "let down", as known to those skilled in the art of bitumen, is an industry term used to reference the dilution or diluting of a concentrate bituminous binder composition to the final concentration that will be used. For example, the process of the present invention can be utilized to produce a bituminous binder concentrate which will contain from about 6% by weight to about 36% by weight, preferably from about 9 to 30%, and more preferably from about 12% by weight to about 22% by weight, block copolymer composition (based on the total weight of the polymer modified bitumen binder composition). This bituminous binder concentrate will at some point be diluted with more bitumen to achieve the desired final concentration for final use (typically from about 2% by weight to about 6% by weight based on the total weight of the polymer modified bitumen binder composition). The process of diluting a polymer modified bituminous binder concentrate to the desired concentration for use is well known in the art as a cost effective method of utilizing blending equipment. The bituminous binder concentrate of the present invention may be diluted ("let down") to the final concentration during or immediately following the curing process or, in the alternative, it may be stored and/or shipped to a different location where it will later be diluted ("let down") to the final concentration. Accordingly, the process of the present invention may optionally contain further steps in the production of polymer modified bituminous binder compositions. One such embodiment allows for the preparation of a concentrate comprising 6 to 36% by weight of the block copolymer composition followed by the dilution of the concentrate with more bitumen to achieve the desired final concentration (preferably for a final concentration of from about 2% by weight to about 6% by weight). This dilution may occur either during curing (step (c)) or subsequent to curing after step (c) provided that the temperature is maintained for the required time to achieve the cure. During or subsequent to curing, the composition maybe shipped to a different location provided that adequate temperature and agitation are maintained. When diluting during the cure, the composition may be diluted as soon as the concentrate blend becomes homogeneous (at the beginning of step (c) or as the composition cures (during step (c)). This embodiment is advantageous when expensive milling equipment is used so that higher throughput may be achieved. Alternatively, the concentrate composition may be let down after the curing process is complete. This embodiment is advantageous for long term storage as the diluting bitumen may be introduced at a much lower temperature resulting in a final blend at a temperature more suitable for long term storage.

In embodiments where the asphalt composition is to be used at that time or where more dilute concentrations are desired, the block copolymer composition will preferably be present in an amount from about 2% by weight to about 6% by weight, and most preferably from about 2.5% by weight to about 5% by weight, based on the total weight of the polymer modified bituminous binder composition.

The present invention further provides for an alternative to the above process that differs from the above process in that the bitumen is first heated to a molten state, the block copolymer composition is added, and then the temperature is raised to the level for curing, from about 180° C. to about 221° C. Accordingly, the present alternative only includes changes in the process steps themselves, not within the types of materials utilized (e.g., bitumen and block copolymer composition) or means of accomplishing the steps (e.g., type of equipment utilized). More specifically, in this alternative, the bitumen component, as described hereinbefore, is heated in a stirred tank until the bitumen component is in a molten state. As used herein, the phrase "molten state" refers to the point at which the bitumen component becomes liquid. Those skilled in the art will recognize that most bitumens reach a "molten state" within the temperature range of from about 87° C. to about 121° C., more specifically from about 93° C. to about 105° C. During this phase, the bitumen component is optionally stirred. Once the bitumen component reaches a molten state, the block copolymer composition can be added in the manner described hereinbefore. Note that while the polymer can be added at this temperature, typically the preference is to heat the bitumen to a temperature of at least 160° C. when the block copolymer is added. At this point, if the mixture is not already being stirred, active stirring may begin although stirring is not necessary. After the block copolymer composition is added, the temperature is raised to from about 180° C. to about 221° C., alternatively from about 180° C. to about 210° C., still alternatively, from about 185° C. to about 199° C., and in still another alternative, from about 185° C. to about 195° C. (as described hereinbefore) while actively stirring the bitumen component and block copolymer composition in order to form a homogeneous mixture of the two components. This mixture will continue to be stirred at the noted temperature for a total of from about 2 hours to about 30 hours as described hereinbefore until a cured polymer modified bituminous binder composition is obtained. In the alternative, the homogeneous mixture will be further let down as described hereinbefore either during or after the curing of the polymer modified bituminous binder composition. As noted above, if the temperature at which the mixture is stirred is greater than 199° C., preferably the mixture will be stirred for a total period of from 2 to 15 hours in order to minimize any degradation of the polymer that might occur. For temperatures less than 199° C. the time for stirring may be extended up to 30 hours.

By using compositions having block copolymers that have a low vinyl block followed by a high vinyl block, as well as a high quantity (>50%) of S-B1-B2 block copolymer, or alternatively compositions having block copolymers that have a block that tapers from low vinyl to high vinyl, as well as a high quantity (>50%) of S-B4 block copolymer, it is possible to achieve a product that exhibits improved ductility, particularly at low temperatures, without the need for the addition of crosslinking agents in the preparation of the polymer modified bitumen. Accordingly, with the present invention it is possible to produce a polymer modified bituminous binder composition or a bituminous binder concentrate having high ductility in the substantial absence of crosslinking agents. Furthermore, as used herein, the phrase "in the substantial absence of crosslinking agents" means that the addition of crosslinking or curing agents during the preparation process is not required. Furthermore, with regard to the bituminous binder composition and the bituminous binder concentrate the phrase "substantially free of crosslinking agents" means that no substantial amount of crosslinking agent is present in the product. However, traces of such crosslinking or curing agents may be present due to the active addition of insubstantial amounts of crosslinking or curing agent or residual amounts from another source such as with the addition of ground rubber and/or what naturally occurs in the bitumen. Such an amount would be considered to be in an insubstantial amount provided that it does not significantly alter the final properties of the bituminous binder composition, typically less than about 0.01% of the total weight of the polymer modified bituminous binder composition or bituminous binder concentrate. In addition to having improved ductility, particularly at low temperatures, the resulting blend also demonstrates storage stable (it does not separate) and good conventional properties.

There are two embodiments of block copolymer compositions that can be used in the above noted processes of the present invention to achieve the desired results noted. The first of these embodiments is described in more specific detail in paragraphs [0028] to [0039] and the second of these embodiments is described in more specific detail in paragraphs [0040] to [0047]. The two embodiments are similar in that both comprise one or more block copolymers that have at least one monovinylaromatic block and a polybutadiene structure (that may either be in the form of one individual block or two different blocks) wherein the polybutadiene structure has a vinyl content such that at one end of the polybutadiene structure (the end adjacent to the monovinylaromatic block) is less than 15 mol percent and the vinyl content at the other end of the polybutadiene structure (the end furthest away from the monovinylaromatic block) is greater than 25 mol percent. In other words, the vinyl content in the polybutadiene structure (regardless of whether it is a one block or two block structure) is considered to taper from a low vinyl content (<15 mol percent) to a higher vinyl content (>25 mol percent). This can be accomplished either by synthesizing discrete polybutadiene blocks of low vinyl content and higher vinyl content or by continuously tapering the vinyl content from low to high in one block. It will be appreciated that a combination of these two procedures will accomplish essentially the same end result.

The first of these embodiments comprises one or more block copolymers having at least one monovinylaromatic block, at least one polybutadiene block having a vinyl content of less than 15 mol percent and at least one polybutadiene block having a vinyl content greater than 25 mol percent. More specifically, the block copolymer compositions of this embodiment utilized in the present invention comprise:

(i) a block copolymer of the formula S-B1-B2 wherein S is a monovinylaromatic hydrocarbon block having a peak molecular weight from about 10,000 to about 25,000, B1 is a polybutadiene block having a vinyl content of less than 15 mol percent, B2 is a polybutadiene block having a vinyl content of greater than 25 mol percent, the ratio of B1 to B2 is greater than or equal to 1:1, and wherein the S-B1-B2 block copolymer has a peak molecular weight from about 40,000 to about 200,000; and (ii) optionally one or more block copolymers selected from $(S-B1-B2)_nX$ wherein each S is a monovinylaromatic hydrocarbon block having a peak molecular weight from about 10,000 to about 25,000, each B1 is a polybutadiene block having a vinyl content of less than 15 mol percent, each B2 is a polybutadiene block having a vinyl content of greater than 25 mol percent, n is an integer from 2 to 6, and X is the residue of a coupling agent, the ratio of B1 to B2 is greater than or equal to 1:1, and wherein the $(S-B1-B2)_nX$ block copolymer has a peak molecular weight from 1.5 to 6.0 times the peak molecular weight of the S-B1-B2 block copolymer, and wherein when both S-B1-B2 and (S-B1-B2)nX are present in the block copolymer composition, the ratio of S-B1-B2 to (S-B1-B2)nX is greater than 1:1.

While the monovinylaromatic hydrocarbon blocks in S-B1-B2 or (S-B1-B2)nX may be any monovinylaromatic hydrocarbon known for use in the preparation of block copolymers such as styrene, o-methylstyrene, p-methylstyrene, p-tert-butylstyrene, 2,4-dimethylstyrene, alpha-methylstyrene, vinylnaphthalene, vinyltoluene and vinylxylene or mixtures thereof, the most preferred monovinylaromatic hydrocarbon for use in the polymers to be used in the process of the present invention is styrene, which is used as a substantially pure monomer or as a major component in mixtures with minor proportions of other structurally related vinyl aromatic monomer(s) such as o-methylstyrene, p-methylstyrene, p-tert-butylstyrene, 2,4-dimethylstyrene, α-methylstyrene, vinylnaphtalene, vinyltoluene and vinylxylene, i.e., in proportions of at most 10% by weight. The use of substantially pure styrene is most preferred in the present process.

The polybutadiene blocks of the above-noted formulas is a polybutadiene monomer that is a substantially pure monomer or contains minor proportions, up to 10% by weight, of structurally related conjugated dienes. Preferably the polybutadiene is pure.

As used herein with regard to the block copolymers of the present invention, the term "molecular weights" refers to the true molecular weight in g/mol of the polymer or block of the copolymer. The molecular weights referred to in this specification and claims can be measured with gel permeation chromatography (GPC) using polystyrene calibration standards, such as is done according to ASTM 3536. GPC is a well-known method wherein polymers are separated according to molecular size, the largest molecule eluting first. The chromatograph is calibrated using commercially available polystyrene molecular weight standards. The molecular weight of polymers measured using GPC so calibrated are styrene equivalent molecular weights. The styrene equivalent molecular weight may be converted to true molecular weight when the styrene content of the polymer and the vinyl content of the diene blocks are known. The detector used is preferably a combination ultraviolet and refractive index detector. The molecular weights expressed herein are measured at the peak of the GPC trace, converted to true molecular weights, and are commonly referred to as "peak molecular weights".

The peak molecular weight of each monovinylaromatic hydrocarbon block is from about 10,000 to about 25,000, preferably from about 12,000 to about 20,000. In an alternative embodiment, the peak molecular weight is from about 14,000 to about 18,000.

Each block copolymer of the formula S-B1-B2 utilized in the process of the present invention will have a peak molecular weight from about 40,000 to about 200,000, preferably from about 65,000 to about 160,000, even more preferably from about 75,000 to about 150,000, and still more preferably from about 75,000 to less than 130,000. The peak molecular weight of the coupled block copolymers of the formula (S-B1-B2)nX is dependent upon the peak molecular weight of the block copolymer of the formula S-B1-B2 utilized. More specifically, the peak molecular weight of the (S-B1-B2)nX block copolymers will range from about 1.5 to about 6.0 times the peak molecular weight of the S-B1-B2 block copolymer. Preferably, the peak molecular weight of the (S-B1-B2)nX block copolymers will range from about 1.8 to about 5.0 times the peak molecular weight of the S-B1-B2 block copolymer.

Taking into consideration the peak molecular weight of the monovinylaromatic block (10,000 to 25,000) and the overall peak molecular weight of the block copolymer, the combined molecular weight of the two butadiene blocks (B1 and B2) will range from about 25,000 to about 190,000. With regard to the two butadiene blocks (B1 and B2), they will be present at a weight ratio to one another of greater than or equal to 1:1. In other words, B1 will be present in an amount (weight percent) greater than or equal to 50% of the total of the B1-B2 segment and B2 will be present in an amount (weight percent) of less than or equal to 50% of the total of the B1-B2 segment.

It will be appreciated that the term "vinyl content" has been used to describe the polymer product that is made when 1,3-butadiene is polymerized via a 1,2-addition mechanism. The result is a monosubstituted olefin group pendant to the polymer backbone, a vinyl group. As noted above, the polybutadiene is present in blocks or segments which contain differing vinyl contents. It is believed that the combination of these "segments" differing in vinyl content that gives the improved ductility of the final product while still exhibiting other desirable properties for polymer modified bitumens. When referring to the first or B1 polybutadiene block, it is preferred that there be less than about 15 mol percent of the condensed polybutadiene units in the polymer block that have a 1,2-addition configuration. In one embodiment, the vinyl content in the B1 block should be such that from about 5 mol percent to about 15 mol percent of the condensed polybutadiene units have a 1,2-addition configuration. Taking into consideration known anionic polymerization of butadiene processes, typically from about 7 to about 15 mol percent of the polybutadiene units will have 1,2-addition configuration. When referring to the second or B2 polybutadiene block, it is preferred that there be greater than 25 mol percent of the condensed polybutadiene units in the polymer block that have a 1,2-addition configuration. Preferably, the vinyl content in the B2 block will be from about 25 mol percent to about 80 mol percent of the condensed polybutadiene units having a 1,2-addition configuration, more preferably from about 40 mol percent to about 75 mol percent of the condensed polybutadiene units having a 1,2-addition configuration, and even more preferably from about 50 to about 65 mol percent of the polybutadiene units having a 1,2-addition configuration.

The monovinylaromatic hydrocarbon content of the copolymers (in the present case with regard to each individual copolymer) is suitably from about 10 to about 40% by weight, based on the total block copolymer. Preferably, the content of monovinylaromatic hydrocarbon of the copolymers will be from about 18 to about 35% by weight, more preferably from about 19 to about 32% by weight, based on the total weight of the copolymer.

In one preferred embodiment of the present invention, the block copolymer composition comprises a block copolymer of the formula S-B1-B2 alone. In the S-B1-B2 block copolymer, S is a monovinylaromatic hydrocarbon block, B1 is a polybutadiene block having a vinyl content of less than 15 mol percent and B2 is a polybutadiene block having a vinyl content of greater than 25 mol percent.

In an alternative preferred embodiment, S-B1-B2 may be used in combination with a coupled block copolymer of the formula (S-B1-B2)nX wherein each S is a monovinylaromatic hydrocarbon block, each B1 is a polybutadiene block having a vinyl content less than 15 mol percent, each B2 is a polybutadiene block having a vinyl content greater than 25, n is an integer from 2 to 6 and X is the residue of a coupling agent. When the multiarm coupled block copolymers of the formula $(S-B1-B2)_nX$ are utilized, as noted above, n will be an integer ranging from 2 to 6. Preferably n will be an integer from 2 to 4, with 2 being the most preferred. While hydrogenation of block copolymers is well known in the art, the block copolymers of the present invention are in substantially unhydrogenated form. When the block copolymer composition comprises such a mixture, the ratio of the S-B1-B2 block copolymer to (S-B1-B2)nX block copolymer will be greater than about 1:1, preferably equal to or greater than about 3:2.

In a particularly preferred embodiment, the ratio will be from about 3:2 to about 10:1 with the most preferred ratio being from about 4:1 to about 7:3. In other words, in the broadest sense of the present invention, when the block copolymer composition comprises a mixture of S-B1-B2 and (S-B1-B2) nX, coupled polymer will always be present in an amount less than that of the S-B1-B2 block copolymer (e.g., the coupled block copolymer will be present in the composition in an amount of at most 49.9% by weight, preferably at most 40% by weight).

As noted above, this block copolymers of the present embodiment may further comprise an additional polybutadiene block (B3) having a vinyl content that is less than 15 mol percent. The vinyl content in the B3 block, when present, will preferably be such that from about 5 mol percent to about 15 mol percent of the condensed polybutadiene units will have a 1,2-addition configuration, preferably from about 7 to about 15 mol percent of the polybutadiene units having the 1,2-addition configuration. When this additional polybutadiene block is present, the formulas for the block copolymers can be represented by the modified formulas S-B1-B2-B3 and (S-B1-B2-B3)nX respectively. In each of these formulas, each B1 and B2 is as defined hereinbefore. In this embodiment, the peak molecular weight of the B3 block would range from about 1,000 to about 25,000 and the overall peak molecular weights of the block copolymers would be within the same range defined above. More specifically, the monovinylaromatic block will remain at 10,000 to 25,000 with the overall peak molecular weight of the three polybutadiene blocks being from about 25,000 to about 190,000 with the weight ratio of B1 to B2 remaining as defined above.

The second of these embodiments comprises one or more block copolymers having at least one monovinylaromatic block and at least one polybutadiene block having a vinyl content that tapers from a vinyl content of less than 15 mol percent at the first end of the polybutadiene block adjacent to the monovinylaromatic block to a vinyl content that is greater than 25 mol percent at the second end of the polybutadiene block which is furthest from the monovinylaromatic block. More specifically, the block copolymer compositions of this embodiment utilized in the present invention will comprise:

(i) a block copolymer of the formula S-B4 wherein S is a monovinylaromatic hydrocarbon block having a peak molecular weight from about 10,000 to about 25,000, B4 is a polybutadiene block having a vinyl content that tapers from less than 15 mol percent at the first end adjacent to the monovinylaromatic block (S) to a vinyl content that is greater than 25 mol percent at the second end which is furthest from the monovinylaromatic block (S) and wherein the S-B4 block copolymer has a peak molecular weight from about 40,000 to about 200,000; and (ii) optionally one or more block copolymers of the formula $(S-B4)_nX$ wherein each S is a monovinylaromatic hydrocarbon block having a peak molecular weight from about 10,000 to about 25,000 and each B4 is a polybutadiene block having a vinyl content that tapers from less than 15 mol percent at the first end adjacent to the monovinylaromatic block (S) to a vinyl content that is greater than 25 mol percent at the second end which is furthest from the monovinylaromatic block (S), n is an integer from 2 to 6, and X is the residue of a coupling agent and wherein the $(S-B4)_nX$ block copolymer has a peak molecular weight that is from 1.5 to 6.0 times the peak molecular weight of the S-B4 block copolymer; and wherein when both S-B4 and $(S-B4)_nX$ are present in the block copolymer composition, the ratio of S-B4 to $(S-B4)_nX$ is greater than 1:1.

The block copolymers of this embodiment may also further comprise an additional polybutadiene block (B5) having a vinyl content that is less than 15 mol percent. When this additional polybutadiene block is present, the formulas for the block copolymers can be represented by the modified formulas S-B4-B5 and (S-B4-B5)nX respectively. In each of these formulas, each B4 is as defined hereinbefore. In this particular embodiment, the peak molecular weight of the B5 block would range from about 1,000 to about 25,000 and the overall peak molecular weights of the block copolymers would be within the same range as defined above.

The monovinylaromatic hydrocarbon blocks (S) in the above noted formulas S-B4 or (S-B4)nX are as defined above, including the peak molecular weights. The polybutadiene of the B4 blocks of the above-noted formulas is polybutadiene monomer that is a substantially pure monomer or contains minor proportions, up to 10% by weight, of structurally related conjugated dienes. Preferably the polybutadiene is pure.

Each block copolymer of the formula S-B4 utilized in the process of the present invention will have a peak molecular weight from about 40,000 to about 200,000, preferably from about 65,000 to about 160,000, even more preferably from about 75,000 to about 150,000. The peak molecular weight of the coupled block copolymers of the formula (ω-B4)nX is dependent upon the peak molecular weight of the block copolymer of the formula S-B4 utilized. More specifically, the peak molecular weight of the (S-B4)nX block copolymers will range from about 1.5 to about 6.0 times the peak molecular weight of the S-B4 block copolymer. Preferably, the peak molecular weight of the (S-B4)nX block copolymers will range from about 1.8 to about 5.0 times the peak molecular weight of the S-B4 block copolymer.

When referring to the B4 polybutadiene block, it is preferred that the vinyl content taper or increase through the polybutadiene block such that the vinyl content ranges from less than 15 mol percent vinyl content (1,2-addition configuration) at the first end of the block adjacent to the monovinylaromatic block (S) to a vinyl content that is greater than 25 mol percent at the second end which is furthest from the monovinylaromatic block (S). As used herein, the term "tapers" refers to the distribution of the 1,2-addition within the polybutadiene block B4 such that one end of the block (the end adjacent to the monovinylaromatic block) has a lesser degree of 1,2-addition (<15 mol percent) compared to the opposite end of the polybutadiene block which has a higher degree of 1,2-addition (>25 mol percent). As a result of the preparation of the polymer, the polybutadiene block is generally considered to progressively increase in 1,2-addition across the expanse of the block. Note however, that while the overall 1,2-addition is said to gradually increase, it should be noted that the block may include small segments of "groupings" of vinyl groups of low vinyl followed by small segments of "groupings" of vinyl groups of higher vinyl. The overall effect though is that the vinyl content increase across the expanse of the block. In other words, the vinyl content would start at an amount less than 15 mol percent and would on average progressively increase throughout the block to an amount greater than 25 mol percent. More specifically, the vinyl content at the first end of the block would range from about 7 to about 15 mol percent of the polybutadiene units having 1,2-addition configuration and would on average increase throughout the block such that at least the last 10% to 49% of the block, preferably 25% to 49% of the block has a vinyl content in which greater than 25 mol percent of the condensed polybutadiene units have a 1,2-addition configuration, preferably from about 25 mol percent to about 80 mol percent, more preferably from about 40 mol percent to about 75 mol, and even more preferably from about 50 to about 65 mol percent of the polybutadiene units in this segment have a 1,2-addition configuration.

In these block copolymers, the monovinylaromatic hydrocarbon content of the copolymers (in the present case with regard to each individual copolymer) is suitably from about 10 to about 40% by weight, based on the total block copolymer. Preferably, the content of monovinylaromatic hydrocarbon of the copolymers will be from about 18 to about 35% by weight, more preferably from about 19 to about 32% by weight, based on the total weight of the copolymer.

In one preferred embodiment of the present invention, the block copolymer composition comprises a block copolymer of the formula S-B4 alone wherein S is a monovinylaromatic hydrocarbon block and B4 is a polybutadiene block having a vinyl content that tapers from less than 15 mol percent at the first end adjacent to the monovinylaromatic block (S) to a vinyl content that is greater than 25 mol percent at the second end which is furthest from the monovinylaromatic block (S).

In an alternative preferred embodiment, S-B4 may be used in combination with a coupled block copolymer of the formula ($\omega$-B4)nX wherein each S is a monovinylaromatic hydrocarbon block and each B4 is a polybutadiene block having a vinyl content that tapers from less than 15 mol percent at the first end adjacent to the monovinylaromatic block (S) to a vinyl content that is greater than 25 mol percent at the second end which is furthest from the monovinylaromatic block (S), n is an integer from 2 to 6 and X is the residue of a coupling agent. When the multiarm coupled block copolymers of the formula (S-B4)$_n$X are utilized, as noted above, n will be an integer ranging from 2 to 6. Preferably n will be an integer from 2 to 4, with 2 being the most preferred. While hydrogenation of block copolymers is well known in the art, the block copolymers of the present invention are in substantially unhydrogenated form. When the block copolymer composition comprises such a mixture, the ratio of the S-B4 block copolymer to (S-B4)nX block copolymer will be greater than about 1:1, preferably equal to or greater than about 3:2. In a particularly preferred embodiment, the ratio will be from about 3:2 to about 10:1 with the most preferred ratio being from about 4:1 to about 7:3. In other words, in the broadest sense of the present invention, when the block copolymer composition comprises a mixture of S-B4 and (S-B4)nX, coupled polymer will always be present in an amount less than that of the S-B4 block copolymer (e.g., the coupled block copolymer will be present in the composition in an amount of at most 49.9% by weight, preferably at most 40% by weight).

The present invention still even further relates to specific classes of block copolymer compositions selected from block copolymer compositions that comprise:

A. from 50.1 wt % to 100 wt % of a block copolymer of the formula S-B1-B2 wherein S, B1 and B2 are as defined hereinbefore, and from 49.9 wt % to 0 wt % of a block copolymer of the formula (S-B1-B2)nX wherein S, B1, B2, n and X are as defined hereinbefore; or B. from 50.1 wt % to 100 wt % of a block copolymer of the formula S-B1-B2-S3 wherein S, B1, B2 and B3 are as defined hereinbefore, and from 49.9 wt % to 0 wt % of a block copolymer of the formula (S-B2-B3)nX wherein S, B1, B2, B3, n and X are as defined hereinbefore; or C. from 50.1 wt % to 100 wt % of a block copolymer of the formula S-B4 wherein S and B4 are as defined hereinbefore, and from 49.9 wt % to 0 wt % of a block copolymer of the formula ($\omega$-B4)nX wherein S, B4, n and X are as defined hereinbefore; or D. from 50.1 w % to 100 w % of a block copolymer of the formula S-B4-B5 wherein S, B4 and B5 are as defined hereinbefore, and from 49.9 wt % to 0 wt % of a block copolymer of the formula ($\omega$-B5)nX wherein S, B4, B5, n and X are as defined hereinbefore.

The block copolymer compositions utilized in the process of the present invention may be prepared by any method known in the art including the well known full sequential polymerization method, optionally in combination with reinitiation, and the coupling method, as illustrated in e.g. U.S. Pat. No. 3,231,635; U.S. Pat. No. 3,251,905; U.S. Pat. No. 3,390,207; U.S. Pat. No. 3,598,887, U.S. Pat. No. 4,219,627, EP 0413294 A2, EP 0387671 B1, EP 0636654 A1 and WO 94/22931, each incorporated herein by reference in their entirety.

It will be appreciated that the block copolymers of the formula S-B1-B2 may be prepared via sequential polymerization wherein a polystyrene block is polymerized in step 1, followed by the addition of a low vinyl polybutadiene block and then a high vinyl polybutadiene block. In the case of the low vinyl polybutadiene block, the butadiene will be polymerized in the absence of a vinyl modifier. For the high vinyl polybutadiene block, the polymerization will occur in the presence of a vinyl modifier with the vinyl modifier being added all at once, concurrently or nearly concurrently, along with the additional dose of butadiene. In the case of the block copolymers of the formula S-B4, the polystyrene block is polymerized in step 1, followed by the addition butadiene in step 2 and then the gradual addition of a vinyl modifier in step 3.

The block copolymers prepared via sequential polymerization may also serve as intermediate living block copolymers (S-B1-B2 or S-B4), which are subsequently coupled by means of a multivalent coupling agent, the initial block copolymer S-B1-B2 or S-B4 content being determined by the coupling efficiency. Normally in the preparation of most block copolymers, a coupling efficiency in the range of from 80% to 97% is desirable. However, in the present process, it is possible to utilize polymers having a coupling efficiency of up to 50%. When coupling efficiency is above 50%, processing viscosities become higher than desirable. Preferably, there is a lower degree of coupling in the range of from 10% to 40% coupling efficiency. More preferably, the coupling efficiency, is in the range of from 10% to 30%, and still more preferred the coupling efficiency is in the range of from 10% to 20%.

The coupling efficiency is preferably no less than 10%. When the coupling efficiency below 10%, the polymers can become too "sticky" to finish in manufacturing operation. For purposes of the present invention, the phrase "coupling efficiency" refers to the number of molecules of coupled polymer divided by the number of molecules of coupled polymer plus the number of molecules of uncoupled polymer. For example, if a coupling efficiency is 80 percent, then the polymer will contain 20 percent diblock. This is well known to those of ordinary skill in the art.

The block copolymers may therefore, for example, be prepared by coupling at least two S-B1-B2 block copolymer molecules together or coupling at least two S-B4 block copolymer molecules. The coupling agent may be any di- or polyfunctional coupling agent known in the art, for example, dibromoethane, diethyl adipate, divinylbenzene, dimethyldichlorosilane, methyl dichlorosilane, silicon tetrachloride and alkoxy silanes (U.S. Pat. No. 3,244,664, U.S. Pat. No. 3,692,874, U.S. Pat. No. 4,076,915, U.S. Pat. No. 5,075,377, U.S. Pat. No. 5,272,214 and U.S. Pat. No. 5,681,895), polyepoxides, polyisocyanates, polyimines, polyaldehydes, polyketones, polyanhydrides, polyesters, polyhalides (U.S. Pat. No. 3,281,383); diesters (U.S. Pat. No. 3,594,452); methoxy silanes (U.S. Pat. No. 3,880,954); divinyl benzene (U.S. Pat. No. 3,985,830); 1,3,5-benzenetricarboxylic acid trichloride (U.S. Pat. No. 4,104,332); glycidoxytrimethoxy silanes (U.S. Pat. No. 4,185,042); and oxydipropylbis(trimethoxy silane) (U.S. Pat. No. 4,379,891).

In general, the polymers useful in the process of the present invention may be prepared by contacting the monomer or monomers with an organoalkali metal compound in a suitable solvent at a temperature within from about −150° C. to about 300° C., preferably at a temperature within the range of from about 0° C. to about 100° C. Particularly effective polymerization initiators are organolithium compounds having the general formula RLi wherein R is an aliphatic, cycloaliphatic, alkyl-substituted cycloaliphatic, aromatic or alkyl-substituted aromatic hydrocarbon radical having from 1 to 20 carbon atoms of which sec butyl is preferred. Suitable solvents include those useful in the solution polymerization of the polymer and include aliphatic, cycloaliphatic, alkyl-substituted cycloaliphatic, aromatic and alkyl-substituted aromatic hydrocarbons, ethers and mixtures thereof. Accordingly, suitable solvents include aliphatic hydrocarbons such as butane, pentane, hexane and heptane, cycloaliphatic hydrocarbons such as cyclopentane, cyclohexane and cycloheptane, alkyl-substituted cycloaliphatic hydrocarbons such as methylcyclohexane and methylcycloheptane, aromatic hydrocarbons such as benzene and the alkyl-substituted hydrocarbons such as toluene and xylene, and ethers such as tetrahydrofuran, diethylether and di-n-butyl ether. Preferred solvents are cyclopentane or cyclohexane.

Techniques to enhance the vinyl content of the conjugated diene portion are well known and may involve the use of polar compounds such as ethers, amines and other Lewis bases and more in particular those selected from the group consisting of dialkylethers of glycols. Most preferred modifiers are selected from dialkyl ether of ethylene glycol containing the same or different terminal alkoxy groups and optionally bearing an alkyl substituent on the ethylene radical, such as monoglyme, diglyme, diethoxyethane, 1,2-diethoxypropane, 1-ethoxy-2,2-tert-butoxyethane, of which 1,2-diethoxypropane is most preferred. In order to achieve the two segments or blocks of polybutadiene having differing 1,2-addition configurations as in the block copolymer of the formula S-B1-B2, the first dose of butadiene is added without the addition of modifier and allowed to polymerize to form B1. After the generation of the first segment B1, additional butadiene is added along with a sufficient quantity of the modifier to achieve a second polybutadiene block (B2) having a higher vinyl content. The modifier may be added all at once in order to produce a second butadiene block that has a fairly consistent vinyl content throughout the block or the modifier may be gradually added in order to produce a second polybutadiene block that is somewhat tapered (with the vinyl content gradually increasing throughout the block). In order to achieve the block of polybutadiene having a tapered vinyl content of less than 15 mol percent at the first end adjacent to the monovinylaromatic block to a vinyl content that is greater than 25 mol percent at the second end which is furthest from the monovinylaromatic block as in the block copolymer of the formula S-B4, the butadiene is added to the reaction vessel and then the modifier to be used is gradually added in a controlled manner in order to give the tapered vinyl content. The amount of modifier utilized will depend on the exact modifier being used. In general, the modifier will be added in an amount from about 50 to about 5000 parts per million basis solvent.

When block copolymers of the formula S-B1-B2-B3 or S-B4-B5 and their corresponding coupled counterparts are desired, the procedure disclosed in U.S. Pat. No. 7,125,940 may be utilized in order to achieve a B3 or B5 polybutadiene block having a low vinyl content. U.S. Pat. No. 7,125,940 is incorporated herein by reference in its entirety.

In addition to the above noted bitumen component and block copolymer compositions, other optional ingredients may be added during the process of the present invention, including, but not limited to, resins, oils, stabilizers, antistatics, fillers (such as talc, calcium carbonate and carbon black), polyphosphoric acid, ground tire rubber or flame retardants. The amount of such optional ingredients added can range from 0 to about 20% by weight, based on the total weight of the bituminous binder composition. Particularly preferred additional ingredients are antioxidants which may be added during or after the mixing process to affect the rate of reaction. When antioxidants are added, they are present in an amount from about 0.1% by weight to about 5% by weight, based on the total weight of the bituminous binder composition. In addition, other block copolymers may also be included in the final bituminous binder composition of the present invention. Preferably such block copolymers will be block copolymers of the general formulas C-D-C or (C-D)nX wherein C is a monovinylaromatic hydrocarbon block and D is a conjugated diene block, n is an integer from 2 to 6 and X is the residue of a coupling agent, said block copolymer having a peak molecular weight from about 30,000 to about 400,000 and a vinyl content from about 8 mol percent to about 25 mol percent based on the number of repeat monomer units in the conjugated diene block of the block copolymer. Examples of such block copolymers include, but are not limited to, Kraton D1101 polymer and Kraton D 1184 polymer, each commercially available from Kraton Polymers LLC. When such additional block copolymers are present, they will preferably be present in an amount up to about 30% by weight, based on the total weight of block copolymer added. When these additional components are added to the process, they are typically added at the same time as the block copolymer composition. Alternatively, these additional components may be added just before the addition of the block copolymer composition or just after the addition of the block copolymer composition.

The present invention further relates to a specific polymer modified bituminous binder composition that is substantially free of any cross-linking agents, said bituminous binder composition comprising:

(a) about 64 to about 98% by weight of a bitumen component as defined hereinbefore; and (b) about 2 to about 36% by weight of any one of the block copolymer compositions as described hereinbefore.

The present invention still further relates to a specific bituminous binder concentrate that is substantially free of any cross-linking agents, said bituminous binder concentrate comprising:

(a) about 64 to about 93% by weight of a bitumen component as defined hereinbefore; and (b) about 7 to about 36% by weight of any one of the block copolymer compositions as described hereinbefore.

While the present invention is particularly suited for hot mix bitumen concrete, the products of the present invention will also be useful in other typical SBS polymer modified bitumen paving applications such as hot chip seals, and cut backs. It is also envisioned that the present invention is suitable for non-paving applications such as modified bitumen roll roofing, self-adhesion waterproofing membranes, sound deadening and vibration damping compounds. The present invention is also useful for recycled asphalt pavement.

The ranges and limitations provided in the instant specification and claims are those which are believed to particularly point out and distinctly claim the instant invention. It is, however, understood that other ranges and limitations that perform substantially the same function in substantially the same way to obtain the same or substantially the same result are intended to be within the scope of the instant invention as defined by the instant specification and claims.

The invention will be described by the following examples which are provided for illustrative purposes only and are not to be construed as limiting the invention.

EXAMPLES

Bitumens 1 to 3

The following three bitumens were used in the examples below. Those skilled in the art are aware that many bitumens can be modified to varying degrees with conventional SBS polymers while others are moderately to extremely difficult to modify. Two bitumens which are generally considered to be "difficult" bitumens were utilized to demonstrate the present invention. More specifically, the European bitumen utilized can typically be modified with SBS polymers but requires sulfur or other crosslinking technology for suitable compatibility. The West Texas bitumen utilized is incompatible to the degree that it typically cannot be modified with SBS polymers at all.

TABLE 1

| Bitumen | | 25° C. pen, units | Softening Point, ° C. |
|---|---|---|---|
| 1 | Incompatible European bitumen (DE 50/70 Grade) | 53 | 51.5 |
| 2 | Compatible naphthenic bitumen | 140-160 | <38 |
| 3 | Incompatible West Texas bitumen | 48 | 54 |

25° C. pen was determined according to ASTM D 5.
Softening Point, ° C. was determined according to ASTM D 36.

Comparative Polymers C1 to C8

The following polymers were used in the formulations for comparative purposes.

TABLE 2

| | Comparative Examples | | | | | | | |
|---|---|---|---|---|---|---|---|---|
| | Comp. Polymer C1[1] | Comp. Polymer C2[2] | Comp. Polymer C3[3] | Comp. Polymer C4[4] | Comp. Polymer C5[5] | Comp. Polymer C6[6] | Comp. Polymer C7[7] | Comp. Polymer C8[8] |
| Styrene block molecular weight* | 9,800 | 10,900 | 16,000 | 16,000 | 16,000 | 16,000 | 16,400 | 16,400 |
| Styrene-Butadiene Diblock molecular weight* | — | 59,300 | 54,000 | 56,000 | 56,000 | None | 83,400 | 83,500 |
| Styrene-Butadiene-Styrene Triblock/radial molecular weight* | 120,000 | 119,300 | 108,000 | 112,000 | 225,000 | 110,000 | 333,000 | 333,000 |
| Styrene content, % by weight basis the total block copolymer | 28.5 | 29.5 | 33 | 31 | 31 | 31 | 32.8 | 32.8 |

TABLE 2-continued

| | Comparative Examples | | | | | | | |
|---|---|---|---|---|---|---|---|---|
| | Comp. Polymer C1[1] | Comp. Polymer C2[2] | Comp. Polymer C3[3] | Comp. Polymer C4[4] | Comp. Polymer C5[5] | Comp. Polymer C6[6] | Comp. Polymer C7[7] | Comp. Polymer C8[8] |
| Coupling efficiency, % | 83 | 82.4 | 25 | 85 | 94 | 100 | 28.6 | 43.0 |
| Vinyl content, mol % | — | 34 | 58 | 8 | 8 | 40 | 63 | 63 |

*The molecular weights referenced are peak molecular weights.
[1]Comparative Polymer C1 s a low vinyl, low molecular weight, low diblock content polymer in pellet form, commercially available from Kraton Polymers LLC as Kraton D1102 polymer.
[2]Comparative Polymer C2 is a medium vinyl, high coupled styrene-butadiene-styrene block copolymer in porous pellet form.
[3]Comparative Polymer C3 is a high vinyl, low coupled styrene-butadiene-styrene block copolymer in porous pellet form as described in U.S. patent application Ser. No. 11/598,511.
[4]Comparative Polymer C4 is a low vinyl, high coupled styrene-butadiene-styrene block copolymer in porous pellet form, commercially available from Kraton Polymers LLC as Kraton D1101 polymer.
[5]Comparative Polymer C5 is a low vinyl, high coupled styrene-butadiene-styrene block copolymer in porous pellet form, previously commercially produced by Kraton Polymers LLC as Kraton D1144 polymer (no longer commercially available).
[6]Comparative Polymer C6 is a high vinyl, high coupled styrene-butadiene-styrene block copolymer in porous pellet form, commercially available from Kraton Polymers LLC as Kraton D1192 polymer.
[7]Comparative Polymer C7 is a 4-arm radial version of Comparative Polymer C3 comprising 29% 4-arm radial polymer and 71% residual diblock (prepared as noted below).
[8]Comparative Polymer C8 is a 4-arm radial version of Comparative Polymer C3 comprising 43% 4-arm radial polymer and 57% residual diblock (prepared as noted below).

Comparative Polymer C7

374 g of styrene was added to 6 liters of cyclohexane at 50° C., after which 23.0 mmol of sec-butyl lithium was added. The reaction was completed after 118 minutes. Thereafter, 4.2 mL 1,2-diethoxypropane was added, followed by the addition of 798 g of butadiene over a period of 20 minutes. The temperature of the reaction mixture rose to 70° C. The polymerization was allowed to proceed at this temperature for 20 minutes. At this point in the polymerization a sample was taken from the reaction and analyzed by GPC test method ASTM D3536. The batch was then split into 2 equal portions (see Comparative Example C8 for the second portion). The first portion was terminated with 3.0 mL of methanol and allowed to stand for 10 minutes. After cooling down the reaction mixture, 0.2% BHT was added for stabilization. The portion was then blended to produce a polymer with 28.6% coupling efficiency. The product was isolated by steam stripping to give white crumbs.

Comparative Polymer C8

The same procedure for Comparative Polymer C7 was utilized in the preparation of Comparative Polymer C8 with the following exceptions: 0.46 mL of the coupling agent GPTS was then added to the second portion of the reaction mixture. The reaction mixture was allowed to stand for 28 minutes at 70° C. then terminated with 1.5 mL of methanol. After cooling down the reaction mixture, 0.2% BHT was added for stabilization. The portion was then blended to produce a polymer having 43.0% coupling efficiency. The product was isolated by steam stripping to give white crumbs.

Inventive Polymers 1 to 3

Inventive polymers 1, 2 and 3 of the present invention were prepared by conventional polymerization methods based on the general procedures noted below:

Inventive Polymer 1

239 g of styrene was added to 6 liters of cyclohexane at 50° C., after which 15.1 mmol of sec-butyl lithium was added. The reaction was complete after 90 minutes and the temperature of the reaction mixture rose to 70° C. Thereafter, 523 g of butadiene was added over a period of 35 minutes. Next, 4.2 mL of 1,2-diethoxypropane was added. This was followed by the addition of 258 grams of butadiene. The polymerization was allowed to proceed at 70° C. for 17 minutes. At this point in the polymerization, a sample was taken from the reaction and analyzed using GPC test method ASTM D3536. 0.74 grams of the coupling agent Epon 826 was then added to the reaction mixture. The reaction mixture was allowed to stand for 30 minutes at 70° C. then terminated with 1.0 mL of methanol. After cooling the reaction mixture, 0.2 w % of BHT was added for stabilization. The product was isolated by steam stripping to give white crumbs.

Inventive Polymer 2

254 g of styrene was added to 6 liters of cyclohexane at 50° C., after which 15.8 mmol of sec-butyl lithium was added. The reaction was complete after 90 minutes and the temperature of the reaction mixture rose to 70° C. Thereafter, 407 g of butadiene was added over a period of 35 minutes. Next, 3.5 mL of 1,2-diethoxypropane was added. This was followed by the addition of 163 grams of butadiene. The polymerization was allowed to proceed at 70° C. for 15 minutes. At this point in the polymerization, a sample was taken from the reaction and analyzed using GPC test method ASTM D3536. 0.53 grams of the coupling agent Epon 826 was then added to the reaction mixture. The reaction mixture was allowed to stand for 10 minutes at 70° C. then terminated with 0.3 mL of methanol. After cooling the reaction mixture, 0.4 w % of BHT was added for stabilization. The product was isolated by steam stripping to give white crumbs.

Inventive Polymer 3

6.24 Kg of styrene was added to 175.5 liters of cyclohexane at 50° C., after which 25.02 g of sec-butyl lithium was added. The reaction was complete after 90 minutes and the temperature of the reaction mixture rose to 70° C. Thereafter, 12.50 Kg of butadiene was added over a period of 30 minutes. Next, 200 g of 1,2-diethoxypropane was added. This was followed by the addition of 6.24 Kg of butadiene. The polymerization was allowed to proceed at 74° C. for 22 minutes. At this point in the polymerization, a sample was taken from the reaction and analyzed using GPC test method ASTM D3536. 15.13 grams of the coupling agent Epon 826 was then added to the reaction mixture. The reaction mixture was allowed to stand for 30 minutes at 70° C. then terminated with 15.84 grams of methanol. After cooling the reaction mixture, 62.5 grams of AO330 was added for stabilization. The product was isolated by steam stripping to give white crumbs.

Table 3 lists the molecular parameters obtained for Inventive Polymers 1, 2 and 3.

TABLE 3

Block Copolymers of the Present Invention

| Property | Inventive Polymer 1 | Inventive Polymer 2 | Inventive Polymer 3 |
| --- | --- | --- | --- |
| (S) - Styrene block molecular weight* | 16,000 | 15,800 | 16,300 |
| (S-B1) - Styrene plus First Butadiene Stage molecular weight* | 57,000 | 41,500*** | 59,500 |
| (S-B1-B2) Styrene-plus first butadiene stage plus second butadiene stage molecular weight* | 79,000 | 54,000 | 90,000 |
| Triblock/radial molecular weight* | 158,000 | 108,000 | 180,000 |
| Styrene content, % by weight basis the total block copolymer | 25 | 29.6 | 23.5 |
| Coupling efficiency, % | 20 | 19 | 19 |
| Total overall vinyl content for block copolymer, mol % | 27.5 | 24 | 25 |
| B2 block (second butadiene stage) vinyl content (calculated), mol %** | 63.8 | 56.9 | 49.3 |

*The molecular weights referenced are peak molecular weights.
**The vinyl content of the second polybutadiene block B2 was calculated based on the measured vinyl content of the first polybutadiene block B1, the measured vinyl content of the whole polymer, and the relative molecular weights of polybutadiene blocks B1 and B2.
***Estimated, not measured.

Examples 1 to 21

For Examples 1 to 21 the following blend procedure was used: Blends utilizing Inventive Polymers 1 to 3 of the present invention, as well as Comparative Polymers C1 to C8, were made by producing a sample comprising the noted bitumen and noted block copolymers wherein the final concentration of block copolymer was 3.0%. The samples were made by mixing the bitumen component and block copolymer composition, heated to a range of from 180 to 199° C., with a Silverson L4R high shear mixer for 2.0 hours while maintaining the temperature within the range noted. Samples were then stirred with a low shear mixer for between 0 and 15 hours for digestion.

All mixtures were tested for Ductility utilizing ASTM D 113-99. The ductility test is a measure of the distance to which a bituminous material will elongate before breaking when two ends of a briquette specimen of the material are pulled apart at a specified speed and at a specified temperature. The test was performed at a temperature of 5° C.±0.5° C. and with a separation speed of 5 cm/min±5.0%. Certain samples were tested for Softening Point Roll and Ball according to ASTM D36, rotational viscosity according to ASTM D4402 and Separation for Storage Stability according to ASTM D5892. Certain samples were also tested for Elastic Recovery according to ASTM D6084. These tests are commonly used to evaluate Polymer Modified Bitumens and are well known to those skilled in the art.

In Table 4, Example 5 is exemplary of the present invention and Examples 1 to 4 are comparative examples. The ductility of Example 5 is substantially higher, both at 5° C. and 25° C., than that of the other Examples, while all five Examples exhibit adequate elastic recovery and softening point.

TABLE 4

Examples 1 to 5

| | Example | | | | |
| --- | --- | --- | --- | --- | --- |
| | 1 | 2 | 3 | 4 | 5 |
| Bitumen | 2 | 2 | 2 | 2 | 2 |
| Polymer | Comp. Polymer C6 | Comp. Polymer C3 | Comp. Polymer C6/Comp. Polymer C3 (50/50 blend) | Comp. Polymer C5/Comp. Polymer C3 (50/50 blend) | Inventive Polymer 1 |
| Concentration, % basis total example | 3.0 | 3.0 | 3.0 | 3.0 | 3.0 |
| Temperature, ° C. | 199 | 199 | 199 | 199 | 199 |
| Stirring Time, high shear, hours | 2 | 2 | 2 | 2 | 2 |
| Stirring Time, low shear, hours | 15 | 15 | 15 | 15 | 15 |
| Soft Point R&B, ° C. | 58 | 52 | 58 | 54 | 52 |
| Ductility @ 5° C., cm | 24 | 12 | 17 | 27 | 36 |
| Ductility @ 25° C., cm | 83 | 94 | 82 | — | 150 |
| Elastic Recovery, % | 85 | 66 | 84 | 81 | 66 |

Table 5 below compares Inventive Polymer 1 as set forth in Example 5 above with differing times and temperatures. Examples 5 to 9 indicate the optimum processing time and temperature of the present invention. Processing at 190° C. gives both the optimum ductility and elastic recovery. The shorter low shear processing time of 6 hours also improves both ductility and elastic recovery.

TABLE 5

Examples 5 to 9

| | Example | | | | |
|---|---|---|---|---|---|
| | 5 | 6 | 7 | 8 | 9 |
| Bitumen | 2 | 2 | 2 | 2 | 2 |
| Polymer | Inventive Polymer 1 | Inventive Polymer 1 | Inventive Polymer 1 | Inventive Polymer 1 | Inventive Polymer 1 |
| Concentration, % basis total example | 3.0 | 3.0 | 3.0 | 3.0 | 3.0 |
| Stirring Time, high shear, hours | 2 | 2 | 2 | 2 | 2 |
| Stirring Time, low shear, hours | 15 | 15 | 6 | 6 | 6 |
| Temperature, ° C. | 199 | 190 | 199 | 190 | 180 |
| Soft Point R&B, ° C. | 53 | 55 | 54 | 52 | 52 |
| Rotational viscosity at 135° C. cps | 810 | 63 | 678 | 565 | 785 |
| Ductility @ 5° C., cm | 36 | 50 | 50 | 58 | 43 |
| Elastic Recovery, % | 64 | 82 | 83 | 93 | 69 |

Examples 10 to 13 demonstrate that the Inventive Polymer of Example 8 above at optimum conditions outperforms other Comparative Polymers at the optimum conditions.

TABLE 6

Examples 10 to 13

| | Example | | | | |
|---|---|---|---|---|---|
| | 8 | 10 | 11 | 12 | 13 |
| Bitumen | 2 | 2 | 2 | 2 | 2 |
| Polymer | Inventive Polymer 1 | Comp. Polymer C6 | Comp. Polymer C3 | Comp. Polymer C6/Comp. Polymer C3 50/50 blend | Comp. Polymer C4 |
| Concentration, % basis total example | 3.0 | 3.0 | 3.0 | 3.0 | 3.0 |
| Temperature, ° C. | 190 | 190 | 190 | 190 | 190 |
| Stirring Time, high shear, hours | 2 | 2 | 2 | 2 | 2 |
| Stirring Time, low shear, hours | 6 | 6 | 6 | 6 | 6 |
| Soft Point R&B, ° C. | 52 | 54 | 51 | 53 | 50 |
| Rotational viscosity at 135° C., cps | 565 | 665 | 592 | 570 | 1280 |
| Ductility @ 5° C., cm | 58 | 44 | 20 | 39 | 42 |

TABLE 6-continued

Examples 10 to 13

| | Example | | | | |
|---|---|---|---|---|---|
| | 8 | 10 | 11 | 12 | 13 |
| Elastic Recovery, % | 93 | 74 | 75 | 75 | 95 |

Examples 14 to 16 demonstrate the improved compatibility of the Inventive Polymer compared to a standard linear styrene-butadiene-styrene copolymer.

TABLE 7

Examples 14 to 16

| | Example | | |
|---|---|---|---|
| | 15 | 16 | 17 |
| Bitumen | 3 | 3 | 3 |
| Polymer | Comp. Polymer C4 | Inventive Polymer 1 | Inventive Polymer 1 |
| Concentration, % basis total example | 3.0 | 3.0 | 3.0 |
| Temperature, ° C. | 190 | 190 | 199 |
| Stirring Time, high shear, hours | 2 | 2 | 2 |
| Stirring Time, low shear, hours | 0 | 6 | 4 |
| Soft Point R&B, ° C. | 56 | 58 | — |
| Separation, ° C. | 21 | 1 | 1 |
| Ductility @ 5° C., cm | — | 12 | 12 |

Examples 17 to 21 demonstrate the scope of molecular parameters of the present invention. Examples 17 and 18 are attempts to increase ductility by adding radial character to a polymer. These examples show that this approach is not effective. Example 19 shows that a low vinyl/high vinyl block structure with a higher polybutadiene molecular weight still gives excellent ductility, but the higher molecular weight will also give higher viscosity which is not desirable. Example 20 shows that reducing the polybutadiene molecular weight causes a significant reduction in ductility.

TABLE 8

Examples 17 to 21

| | Example | | | | |
|---|---|---|---|---|---|
| | 17 | 18 | 19 | 20 | 21 |
| Bitumen | 2 | 2 | 2 | 2 | 2 |
| Polymer | Comp. Polymer 7 | Comp. Polymer 8 | Inventive Polymer 3 | Inventive Polymer 2 | Inventive Polymer 1 |
| Concentration, % basis total example | 3.0 | 3.0 | 3.0 | 3.0 | 3.0 |
| Temperature, ° C. | 199 | 199 | 190 | 190 | 190 |
| Stirring Time, high shear, hours | 2 | 2 | 2 | 2 | 2 |
| Stirring Time, low shear, hours | 6 | 6 | 6 | 6 | 6 |
| Ductility @ 5° C., cm | 18 | 24 | 62 | 26 | 53 |

Examples 22 to 28

For Examples 22 to 28 the following blend procedure was used: The bitumen utilized was heated to a range of from 160 to 180° C. and 5.0% by weight of the noted polymer was added. The temperature was then increased to 200° C. at which the blend was stirred at low speed for 7 hours open to the air while maintaining the temperature within the range noted. The blend was then split into two halves. One half was set aside for testing and the other half was stirred for another 17 hours to complete the 24 hour period after which it was tested parallel to the 7 hour sample. In parallel comparative samples were blended with 5% of the following samples: Comparative Polymer C2, Comparative Polymer C1 and Comparative Polymer C3.

All mixtures were tested for Ductility utilizing ASTM D113-99. The test was performed at a temperature of 13° C.+/−0.5° C. and with a separation speed of 5 cm/min+5.0%. Samples were also tested for Softening Point Ring and Ball according to ASTM D36, Penetration according to ASTM D5, Elastic Recovery according to ASTM D6084 and Fraass Temperature according to EN12593. As noted above, such tests are commonly used to evaluate Polymer Modified Bitumens and are well known to those skilled in the art.

Examples 22 to 28 demonstrate the effectiveness of the polymers of the present invention in meeting a stringent specification in an incompatible bitumen. The Inventive Polymer in Examples 24 and 25 show a superior combination of high softening point, good ductility, good elastic recovery and low Fraass temperature.

TABLE 9

Examples 22 to 28

| | Example 22 | Example 23 | Example 24 | Example 25 | Example 26 | Example 27 | Example 28 |
|---|---|---|---|---|---|---|---|
| Bitumen | 1 | 1 | 1 | 1 | 1 | 1 | 1 |
| Polymer | Comp. Polymer C2 | Comp. Polymer C2 | Inventive Polymer 1 | Inventive Polymer 1 | Comp. Polymer C1 | Comp. Polymer C3 | Comp. Polymer C3 |
| Concentration, % basis total example | 5.0 | 5.0 | 5.0 | 5.0 | 5.0 | 5.0 | 5.0 |
| Temp., ° C. | 200 | 200 | 200 | 200 | 200 | 200 | 200 |
| Stirring Time, high shear, hours | 7 | 24 | 7 | 24 | 7 | 0 | 24 |
| Soft Point R&B | 63.5 | 71.5 | 69.0 | 78.5 | 65.5 | 59.5 | 93.0 |
| Penetration 25° C., units | 38 | 30 | 40 | 32 | 36 | 46 | 26 |
| 120° C., mPas | 4930* | 11510* | 6192* | 21720* | 6313* | 6300* | 32900* |
| 150° C., mPas | 968 | 1853 | 1265 | 2248 | 1182 | 1170 | 2800 |
| 180° C., mPas | 300 | 545 | 398 | 686 | 363 | 334 | 680 |
| Ductility @ 13° C., cm | 47 | 20.5 | 59.4 | 28.7 | 48.0 | 19.8 | 14.3 |
| Elastic Recovery @ 13° C. | 81.8 | 79.0 | 71.3 | 81.1 | 71.2 | 70.7 | n.m. |
| Fraass Temp., ° C. | −11.9 | −19.3 | −14.9 | −21.4 | −11.6 | −13 | −17 |

What is claimed is:

1. A process for preparing a polymer modified bituminous binder composition in the substantial absence of crosslinking agents, said process comprising the steps of:
   (a) heating a bitumen component in a stirred tank to a temperature from 160° C. to 221° C.;
   (b) adding a block copolymer composition to the bitumen component while the bitumen component is being stirred to form a homogeneous mixture of the bitumen component and the block copolymer composition; and
   (c) continuing to stir the homogeneous mixture at a temperature from 180° C. to 221° C. for a total period of time from 2 hours to 30 hours thereby forming a cured polymer modified bituminous binder composition;
wherein said block copolymer composition comprises
   (i) a block copolymer of the formula S-B1-B2 wherein S is a monovinylaromatic hydrocarbon block having a peak molecular weight from 10,000 to 25,000, B1 is a polybutadiene block having a vinyl content of less than 15 mol percent, B2 is a polybutadiene block having a vinyl content of greater than 25 mol percent, wherein the weight ratio of B1 to B2 is greater than or equal to 1:1, and wherein the S-B1-B2 block copolymer has a peak molecular weight from 40,000 to 200,000; and
   (ii) optionally one or more block copolymers of the formula $(S-B1-B2)_nX$ wherein each S is a monovinylaromatic hydrocarbon block having a peak molecular weight from 10,000 to 25,000, each B1 is a polybutadiene block having a vinyl content of less than 15 mol percent, each B2 is a polybutadiene block having a vinyl content of greater than 25 mol percent, n is an integer from 2 to 6, and X is the residue of a coupling agent, wherein the weight ratio of 1 to B2 is greater than or equal to 1:1, and wherein the $(S-B1-B2)_nX$ block copolymer has a peak molecular weight that is from 1.5 to 6.0 times the peak molecular weight of the S-B1-B2 block copolymer; with the proviso that when the temperature in step c is greater than 199° C., the total time for stirring the homogeneous mixture in step (c) will range from 2 to 15 hours; and with the further proviso that when both S-1-B2 and $(S-1-B2)_nX$ are present in the block copolymer composition, the ratio of S-B1-B2 to $(S-B1-B2)_nX$ is greater than 1:1.

2. The process of claim 1 wherein the block copotymer composition comprises S-B1-B2 and (S-B1-B2)nX and the ratio of S-B1-B2 to $(S-B1-B2)_nX$ in the block copolymer composition is greater than or equal to 3:2.

3. The process of claim 2 wherein the amount of block copolymer composition added to the bitumen component is from 2 to 36 weight percent, based on the total weight of the polymer modified bituminous binder composition.

4. The process of claim 3 further comprising the addition of a block copolymer of the formula C-D-C or (C-D)nX during step (b), wherein C is a monovinylaromatic hydrocarbon block and D is a conjugated diene block, n is an integer from 2 to 6 and X is a coupling agent residue.

5. The process of claim 4 wherein C is styrene, D is butadiene, isoprene or mixtures thereof and the additional block copolymer is added in an amount up to 30% by weight, of the total amount of block copolymer added.

6. The process of claim 3 wherein the temperature in step (c) is from 185° C. to 199° C.

7. The process of claim 1 wherein the ratio of S-B1-B2 to $(S-B1-B2)_nX$ in the block copolymer composition is from 3:2 to 10:1.

8. The process of claim 7 wherein for the block copolymer S-B1-B2, the peak molecular weight is from 65,000 to 160,000, S is styrene, the polystyrene content is from 15 to 35%, the vinyl content for B1 is from 5 to 15 mol percent based on the number of repeat monomer units in the B1 block, and the vinyl content for B2 is from 25 to 80 mol percent based on the number of repeat monomer units in the B2 block, and for (S-B1-B2)nX, the peak molecular weight is 1.8 to 5.0 times the peak molecular weight of 5-B1-B2, S is styrene, the polystyrene content is from 15 to 35%, the vinyl content for B1 is from 5 to 15 mol percent based on the number of repeat monomer units in the 1 block, and the vinyl content for B2 is from 25 to 80 mol percent based on the number of repeat monomer units in the B2 block.

9. The process of claim 6 wherein the polymer modified bituminous binder composition produced is in the form of a concentrate having from 6 to 30 weight percent block copolymer composition, based on the total weight of the concentrate.

10. The process of claim 9 which further comprises the step of diluting the homogeneous mixture either during or after the curing of the polymer of the polymer modified binder composition.

11. The process of claim 1 wherein the block copolymer composition comprises S- B1-B2 wherein S is styrene, and the polystyrene content is from 15 to 35%.

12. The process of claim 6 wherein the amount of block copolymer composition added to the bitumen component is from 2 to 10 weight percent, based on the total final weight of the polymer modified bituminous binder composition to be used.

13. The process of claim 10 wherein the final concentration of block copolymer composition after dilution is 2 to 6 weight percent based on the total weight of the polymer modified bituminous binder composition.

14. The process of claim 1 wherein the stirring in step (b) is at high shear and the stirring in step (c) is at low shear.

15. The process of claim 6 wherein the stirring in step (b) is at high shear for a period of time from 0.5 to 4 hours and the stirring in step (c) is at low shear for a period of time from 2.0 hours to 15 hours.

16. A bituminous binder composition substantially free of cross-linking agents, said bituminous binder composition comprising:
   (a) 64 to 98% by weight of a bitumen component; and
   (b) 2 to 36% by weight of a block copolymer composition block copolymer
composition comprising:
   (i) a block copolymer of the formula S-B1-B2 wherein S is a monovinylaromatic hydrocarbon block have a peak molecular weight from 10,000 to 25,000, B1 is a conjugated diene block having a vinyl content of less than 15 mol percent, B2 is a conjugated diene block having a vinyl content of greater than 25 mol percent, wherein the weight ratio of B1 to B2 is greater than or equal to 1:1, and wherein the S-B1-B2 block copolymer has a peak molecular weight from about 40,000 to 200,000; and
   (ii) optionally one or more block copolymers of the formula $(S-B1-B2)_nX$ wherein each S is a monovinylaromatic hydrocarbon block having a peak molecular weight from 10,000 to 25,000, each B1 is a polybutadiene block having a vinyl content of less than 15 mol percent, each B2 is a polybutadiene block having a vinyl content of greater than 25 mol percent, n is an integer from 2 to 6, and X is the residue of a coupling agent, wherein the weight ratio of B1 to B2 is greater than or equal to 1:1, and wherein the (S-B1-B2)$_n$X block copolymer has a peak molecular weight that is from 1.5 to 6.0 times the peak molecular weight of the S-B1-B2 block copolymer; and wherein when both S-B1-B2 and (S-B1-B2)$_n$X are present in the block copolymer composition, the ratio of S-B1-B2 to (S-B1-B2)$_n$X is greater than 1:1.

17. The bituminous binder composition of claim 16 wherein the block copolymer composition comprises S-B1-B2 and (S-B1-B2)nX and the ratio of S-B1-B2 to (S-B1-B2)$_n$X in the block copolymer composition is greater than or equal to 3:2.

18. The bituminous binder composition of claim 17 wherein the amount of block copolymer composition added to the bitumen component is from 2 to 36 weight percent, based on the total weight of the polymer modified bituminous binder composition.

19. The bituminous binder composition of claim 18 wherein the block copolymer composition further comprises the addition of a block copolymer of the formula C-D-C or (C-D)nX, wherein C is a monovinylaromatic hydrocarbon block and D is a conjugated diene block, n is an integer from 2 to 6 and X is a coupling agent residue.

20. The bituminous binder composition of claim 19 wherein C is styrene, D is butadiene, isoprene or mixtures thereof and the additional block copolymer is present in the block copolymer composition comprises an amount up to 30% by weight, of the total amount of block copolymer added to the bituminous binder composition.

21. The bituminous binder composition of claim 17 wherein the ratio of S-B1-B2 to (S-B1-B2)$_n$X in the block copolymer composition is from 3:2 to 10:1.

22. The bituminous binder composition of claim 21 wherein for the block copolymer S-B1-B2, the peak molecular weight is from 65,000 to 160,000, S is styrene, the polystyrene content is from 15 to 35%, the vinyl content for B1 is from 5 to 15 mol percent based on the number of repeat monomer units in the B1 block, and the vinyl content for B2 is from 25 to 80 mol percent based on the number of repeat monomer units in the B2 block, and for (S-B1-B2)nX, the peak molecular weight is 1.8 to 5.0 times the peak molecular weight of S-B1-B2, S is styrene, the polystyrene content is from 15 to 35%, the vinyl content for B1 is from 5 to 15 mol percent based on the number of repeat monomer units in the B1 block, and the vinyl content for B2 is from 25 to 80 mol percent based on the number of repeat monomor units in the B2 block.

23. The bituminous binder composition of claim 16 wherein the block copolymer composition comprises S-B1-B2 wherein S is styrene, and the polystyrene content is from 15 to 35%.

24. The bituminous binder composition of claim 22 wherein the composition comprises from 6 to 36% by weight of block copolymer composition.

25. The bituminous binder composition of claim 23 wherein the composition comprises from 6 to 36% by weight of block copolymer composition.

26. The bituminous binder composition of claim 24 wherein the peak molecular weight of S-B1-B2 is from 65,000 to 160,000, S is styrene, the polystyrene content is from 15 to 35%, the vinyl content for B1 is from 5 to 15 mol percent based on the number of repeat monomer units in the B1 block, the vinyl content for B2 is from 40 to 75 mol percent based on the number of repeat monomer units in the B2 block.

27. A block copolymer composition comprising:
(i) a block copolymer of the formula S-B1-B2 wherein S is a monovinylaromatic hydrocarbon block having a peak molecular weight from 10,000 to 25,000, B1 is a polybutadiene block having a vinyl content of less than 15 mol percent, B2 is a polybutadiene block having a vinyl content of greater than 25 mol percent, wherein the weight ratio of B1 to B2 is greater than or equal to 1:1, and wherein the S-B1-B2 block copolymer has a peak molecular weight from about 40,000 to 200,000; and
(ii) optionally a block copolymer of the formula (S-B1-B2)nX wherein S is a monovinylaromatic hydrocarbon block having a peak molecular weight from 10,000 to 25,000, B1 is a polybutadiene block having a vinyl content of less than 15 mol percent, B2 is a polybutadiene block having a vinyl content of greater than 25 mol percent, n is an integer from 2 to 4, X is the residue of a coupling agent, wherein the weight ratio of B1 to B2 is greater than or equal to 1:1, and wherein the coupled block copolymers have a peak molecular weight that is from 1.5 to 6.0 times the peak molecular weight of the S-B1-B2 block copolymer, and wherein when both S-B1-B2 and (S-B1-B2)nX are present in the block copolymer composition, the ratio of S-B1-B2 to (S-B1-B2)nX is greater than 1:1.

28. The block copolymer composition of claim 27 wherein the ratio of S-B1-B2 to (S-B1-B2)nX is greater than or equal to 3:2.

29. The block copolymer composition of claim 28 wherein the peak molecular weight of S-B1-B2 is from 65,000 to 160,000, S is styrene, the polystyrene content is from 15 to 35%, the vinyl content for B1 is from 5 to 15 mol percent based on the number of repeat monomer units in the B2 block, the vinyl content for B2 is from 25 to 80 mol percent based on the number of repeat monomer units in the B2 block, and the peak molecular weight of (S-B1-B2)nX block copolymer is 1.8 to 5.0 times the peak molecular weight of S-B1-B2 block copolymer, S is styrene, the polystyrene content is from 15 to 35%, n is from 2 to 4, the vinyl content for B1 is from 5 to 15 mol percent based on the number of repeat monomer units in the B2 block, the vinyl content for B2 is from 25 to 80 mol percent based on the number of repeat monomer units in the B2 block.

30. A process for preparing a polymer modified bituminous binder composition in the substantial absence of crosslinking agents, said process comprising the steps of:
(a) heating a bitumen component in a stirred tank until it reaches a molten state;
(b) adding a block copolymer composition to the bitumen component;
(c) raising the temperature of the bitumen component and block copolymer composition to from about 180° C. to about 221° C. while stirring the bitumen component and block copolymer composition in order to form a homogeneous mixture of the bitumen component and the block copolymer composition; and
(d) continuing to stir the homogeneous mixture while maintaining the temperature for a total period of time from about 2 hours to about 30 hours until a cured polymer modified bituminous binder composition is obtained;

with the proviso that in step (c) when the temperature is greater than 199° C., the homogeneous mixture is stirred for a total period of time from 2 to 15 hours, and wherein said block copolymer composition comprises block copolymer composition comprises (i) a block copolymer of the formula S-B1-B2 wherein S is a monovinylaromatic hydrocarbon block having a peak molecular weight from 10,000 to 25,000, B1 is a polybutadiene block having a vinyl content of less than 15 mol percent, B2 is a polybutadiene block having a vinyl content of greater than 25 mol percent, wherein the weight ratio of B1 to B2 is greater than or equal to 1:1, and wherein the S-B1-B2 block copolymer has a peak molecular weight from about 40,000 to 200,000; and (ii) optionally one or more block copolymers of the formula (S-B1-B2)$_n$X wherein each S is a monovinylaromatic hydrocarbon block having a peak molecular weight from 10,000 to 25,000, each B1 is a polybutadiene block having a vinyl content of less than 15 mol percent, each B2 is a polybutadiene block having a vinyl content of greater than 25 mol percent, n is an integer from 2 to 6, and X is the residue of a coupling agent, wherein the weight ratio of B1 to B2 is greater than or equal to 1:1, and wherein the (S-B1-B2)$_n$X block copolymer has a peak molecular weight that is from 1.5 to 6.0 times the peak molecular weight of the S-B1-B2 block copolymer; and wherein when both S-B1-B2 and (S-B1-B2)$_n$X are present in the block copolymer composition, the ratio of S-B1-B2 to (S-B1-B2)$_n$X is greater than 1:1.

31. The process of claim 30 comprising the further step of diluting the homogeneous mixture either during or after the curing of the polymer modified bituminous binder composition.

32. A process for preparing a polymer modified bituminous binder composition in the substantial absence of crosslinking agents, said process comprising the steps of:

(a) heating a bitumen component in a stirred tank to a temperature from 160° C. to 221° C.;

(b) adding a block copolymer composition to the bitumen component while the bitumen component is being stirred to form a homogeneous mixture of the bitumen component and the block copolymer composition; and (c) continuing to stir the homogeneous mixture at a temperature from 180° C. to 221° C. for a total period of time from 2 hours to 30 hours thereby forming a cured polymer modified bituminous binder composition;

wherein said block copolymer composition comprises (i) a block copolymer of the formula S-B4 wherein S is a monovinylaromatic hydrocarbon block having a peak molecular weight from 10,000 to 25,000 and B4 is a polybutadiene block having a vinyl content that tapers from a vinyl content of less than 15 mol percent at the first end adjacent to the monovinylaromatic block to a vinyl content that is greater than 25 mol percent at the second end which is furthest from the monovinylaromatic block, wherein the S-B4 block copolymer has a peak molecular weight from about 40,000 to 200,000; and (ii) optionally one or more block copolymers of the formula (S-B4)$_n$X wherein each S is a monovinylaromatic hydrocarbon block having a peak molecular weight from 10,000 to 25,000, each B4 is a polybutadiene block having a vinyl content that tapers from a vinyl content of less than 15 mol percent at the first end adjacent to the monovinylaromatic block to a vinyl content that is greater than 25 mol percent at the second end which is furthest from the monovinylaromatic block, n is an integer from 2 to 6, and X is the residue of a coupling agent, wherein the (S-B4)$_n$X block copolymer has a peak molecular weight that is from 1.5 to 6.0 times the peak molecular weight of the S-B4 block copolymer;

with the proviso that when the temperature in step c is greater than 199° C., the total time for stirring the homogeneous mixture in step (c) will range from 2 to 15 hours; and with the further proviso that when both S-B4 and (S-B4)$_n$X are present in the block copolymer composition, the ratio of S-B4 to (S-B4)$_n$X is greater than 1:1.

33. The process of claim 32 wherein the block copolymer composition comprises S-B4 and (S-B4)nX and the ratio of S-B4 to (S-B4)$_n$X in the block copolymer composition is greater than or equal to 3:2.

34. The process of claim 33 further comprising the addition of a block copolymer of the formula C-D-C or (C-D)nX during step (b), wherein C is a monovinylaromatic hydrocarbon block and D is a conjugated diene block, n is an integer from 2 to 6 and X is a coupling agent residue.

35. The process of claim 34 wherein C is styrene, D is butadiene, isoprene or niixtures thereof and the additional block copolymer is added in an amount up to 30 % by weight, of the total amount of block copolymer added.

36. The process of claim 32 wherein the block copolymer composition comprises S-B4.

37. The process of claim 32 wherein the stirring in step (b) is at high shear and the stirring in step (c) is at low shear.

38. The process of claim 37 wherein the stirring in step (b) is at high shear for a period of time from 0.5 to 4.0 hours and the stirring in step (c) is at low shear for a period of time from 2.0 hours to 15 hours.

39. A bituminous binder composition substantially free of cross-linking agents, said bituminous binder composition comprising:

(a) 64 to 98% by weight of a bitumen component; and (b) 2 to 36% by weight of a block copolymer composition block copolymer composition comprising:

(i) a block copolymer of the formula S-B4 wherein S is a monovinylaromatic hydrocarbon block having a peak molecular weight from 10,000 to 25,000 and B4 is a polybutadiene block having a vinyl content that tapers from a vinyl content of less than 15 mol percent at the first end adjacent to the monovinylaromatic block to a vinyl content that is greater than 25 mol percent at the second end which is furthest from the monovinylaromatic block, wherein the S-B4 block copolymer has a peak molecular weight from about 40,000 to 200,000; and (ii) optionally one or more block copolymers of the formula (S-B4)$_n$X wherein each S is a monovinylaromatic hydrocarbon block having a peak molecular weight from 10,000 to 25,000, each B4 is a polybutadiene block having a vinyl content that tapers from a vinyl content of less than 15 mol percent at the first end adjacent to the monovinylaromatic block to a vinyl content that is greater than 25 mol percent at the second end which is furthest from the monovinylaromatic block, n is an integer from 2 to 6, and X is the residue of a coupling agent, wherein the (S-B4)$_n$X block copolymer has a peak molecular weight that is from 1.5 to 6.0 times the peak molecular weight of the S-B4 block copolymer;

with the further proviso that when both S-B4 and (S-B4)$_n$X are present in the block colymer composition, the ratio of S-B4 to (S-B4)$_n$X is greater than 1:1.

40. A block copolymer composition comprising:

(i) a block copolymer of the formula S-B4 wherein S is a monovinylaromatic hydrocarbon block having a peak molecular weight from 10,000 to 25,000 and B4 is a polybutadiene block having a vinyl content that tapers from a vinyl content of less than 15 mol percent at the first end adjacent to the monovinylaromatic block to a vinyl content that is greater than 25 mol percent at the second end which is furthest from the monovinylaromatic block, wherein the S-B4 block copolymer has a peak molecular weight from about 40,000 to 200,000; and (ii) optionally one or more block copolymers of the formula $(S-B4)_nX$ wherein each S is a monovinylaromatic hydrocarbon block having a peak molecular weight from 10,000 to 25,000, each B4 is a polybutadiene block having a vinyl content that tapers from a vinyl content of less than 15 mol percent at the first end adjacent to the monovinylaromatic block to a vinyl content that is greater than 25 mol percent at the second end which is furthest from the monovinylaromatic block, n is an integer from 2 to 6, and X is the residue of a coupling agent, wherein the $(S-B4)_nX$ block copolymer has a peak molecular weight that is from 1.5 to 6.0 times the peak molecular weight of the S-B4 block copolymer;

with the further proviso that when both S-B4 and $(S-B4)_nX$ are present in the block copolymer composition, the ratio of S-B4 to $(S-B4)_nX$ is greater than 1:1.

41. A process for preparing a polymer modified bituminous binder composition in the substantial absence of crosslinking agents, said process comprising the steps of:

(a) heating a bitumen component in a stirred tank until it reaches a molten state;

(b) adding a block copolymer composition to the bitumen component;

(c) raising the temperature of the bitumen component and block copolymer composition to from about 180° C. to about 221° C. while stirring the bitumen component and block copolymer composition in order to form a homogeneous mixture of the bitumen component and the block copolymer composition; and (d) continuing to stir the homogeneous mixture while maintaining the temperature for a total period of time from about 2 hours to about 30 hours until a cured polymer modified bituminous binder composition is obtained;

with the proviso that in step (c) when the temperature is greater than 199° C., the homogeneous mixture is stirred for a total period of time from 2 to 15 hours, and wherein said block copolymer composition comprises block copolymer composition comprises:

(i) a block copolymer of the formula S-B4 wherein S is a monovinylaromatic hydrocarbon block having a peak molecular weight from 10,000 to 25,000 and B4 is a polybutadiene block having a vinyl content that tapers from a vinyl content of less than 15 mol percent at the first end adjacent to the monovinylaromatic block to a vinyl content that is greater than 25 mol percent at the second end which is furthest from the monovinylaromatic block, wherein the S-B4 block copolymer has a peak molecular weight from about 40,000 to 200,000; and (ii) optionally one or more block copolymers of the formula $(S-B4)_nX$ wherein each S is a monovinylaromatic hydrocarbon block having a peak molecular weight from 10,000 to 25,000, each B4 is a polybutadiene block having a vinyl content that tapers from a vinyl content of less than 15 mol percent at the first end adjacent to the monovinylaromatic block to a vinyl content that is greater than 25 mol percent at the second end which is furthest from the monovinylaromatic block, n is an integer from 2 to 6, and X is the residue of a coupling agent, wherein the $(S-B4)_nX$ block copolymer has a peak molecular weight that is from 1.5 to 6.0 times the peak molecular weight of the S-B4 block copolymer;

with the further proviso that when both S-B4 and $(S-B4)_nX$ are present in the block copolymer composition, the ratio of S-B4 to $(S-B4)_nX$ is greater than 1:1.

* * * * *

UNITED STATES PATENT AND TRADEMARK OFFICE
CERTIFICATE OF CORRECTION

PATENT NO.        : 7,622,519 B2
APPLICATION NO.   : 12/111249
DATED             : November 24, 2009
INVENTOR(S)       : Robert Q. Kluttz et al.

It is certified that error appears in the above-identified patent and that said Letters Patent is hereby corrected as shown below:

Col. 29, Claim 1(c)(ii), line 9, please delete "1" and insert --B1--;
Col. 29, Claim 1(c)(ii), line 17, please delete "S-1-B2" and insert --S-B1-B2--;
Col. 29, Claim 1(c)(ii), line 17, please delete "(S-1-B2)nX" and insert --(S-B1-B2)nX--;
Col. 30, Claim 8, line 9, please delete "5-B1-B2" and insert --S-B1-B2--;
Col. 30, Claim 8, line 12, please delete "1" and insert --B1--; and
Col. 30, Claim 10, line 3, please delete second occurrence of "of the polymer".

Signed and Sealed this

Twenty-ninth Day of December, 2009

David J. Kappos
*Director of the United States Patent and Trademark Office*